United States Patent Office 3,028,321
Patented Apr. 3, 1962

3,028,321
ELECTROCHEMICAL PRODUCTION OF FLUORO-
CARBON ACID FLUORIDES
Richard D. Danielson, New Canada Township, Ramsey County, and John W. Sargent, St. Paul, Minn., assignors to Minnesota Mining and Manufacturing Company, St. Paul, Minn., a corporation of Delaware
No Drawing. Filed Nov. 23, 1956, Ser. No. 623,800
5 Claims. (Cl. 204—59)

This invention relates to an electrochemical process of making fluorocarbon acid fluorides by electrolyzing, in a cell containing an electrode pack having nickel anodes, a current-conducting electrolyte solution comprising anhydrous liquid hydrogen fluoride mixed with a hydrocarbon acid halide as the organic starting compound; characterized by the novel feature that the electrolyte solution includes an organic sulfur compound (an alkyl compound containing sulfur in its bivalent form) as an additive that functions to maintain continuously good operating conditions, in particular by inhibiting the formation of undesirable tarry material in the solution and its deposition on the anodes.

The hydrocarbon acid halides employed as the organic starting compounds are those in which one or more acid halide groups are attached to a hydrocarbon group or chain of the molecule; the acid halide group being a carbonyl halide group (—COX) or a sulfonyl halide group (—SO$_2$X). The "X" in these group formulas stands for F, Cl, Br or I.

This invention provides a valuable improvement of the electrochemical fluorination process as applied to the fluorination of these acid halide starting compounds to produce the corresponding saturated perfluorocarbon acid fluoride product compounds. These product compounds have value for making a variety of useful perfluorocarbon derivatives, such as acids, salts, amides, esters, alcohols and amines. The high cost of such fluorocarbon compounds has been an obstacle to extensive industrial usage. The present invention is of economic importance in materially reducing the cost of manufacture. The invention is of particular value in cases where aromatic starting compounds are employed as these are particularly prone to tar formation.

Previously employed electrochemical operating conditions resulted in undesirable side reactions and the relatively rapid formation of tarry material in the electrolyte solution and deposition of tarry deposits on the anodes, which caused a decrease in yield, a decrease in electrical efficiency, and relatively short runs before the cell had to be shut down to replace the fouled electrode pack and the fouled electrolyte solution. The recovery of desired product compounds in pure form was rendered more difficult by the presence of tarry material.

Prior procedures have been described in U.S. Patents Nos. 2,717,871 (Sept. 13, 1955) and 2,732,398 (Jan. 24, 1956). These patents also describe the electrochemical cell apparatus. Photographs of laboratory and pilot plant cells, employing nickel-anode electrode packs, appear at pages 417–418 of the book "Flourine Chemistry," edited by J. H. Simons (published by Academic Press, Inc., New York, 1950). The electrode pack consists of alternating and closely-spaced iron cathode plates and nickel anode plates, and the applied D.C. cell voltage is in the range of approximately 4 to 6 volts. The cell can be conveniently operated at substantially atmospheric pressure at temperatures ranging from below 0° C. to about 20° C., or at higher temperatures and pressures. The organic starting material may suitably be initially present in a concentration of about 5 to 20% by weight and both it and the hydrogen fluoride are replenished from time to time. The exit gas mixture is passed through a refrigerated condenser to condense out most of the HF vapor that has evolved with it and this liquid HF is drained back into the cell. The perfluorinated products of the process are insoluble in liquid HF and either settle to the bottom of the cell or evolve with the hydrogen and other gaseous cell products, depending upon volatility, and can be readily recovered.

The first of the above-cited patents relates particularly to the electrochemical fluorination of carboxylic acid halides (compounds containing one or more carbonyl halide groups), and the second to sulfonic acid halides (compounds containing one or more sulfonyl halide groups). The process results in perfluorination by replacement of all carbon-bonded hydrogen atoms by fluorine atoms, saturation of aromatic rings or other unsaturated structures (when present) by addition of fluorine, and in the case of a halide other than a fluoride, the chlorine, bromine or iodine atoms are replaced by fluorine atoms so that in every case a saturated acid fluoride product compound is obtained.

Our discovery of the utility of including in the electrolyte solution the aforesaid organic sulfur compound as an additive, was empirical and unexpected. We are still unable to provide a satisfactory explanation or to show how this surprising result could be deduced from prior knowledge.

The organic sulfur-containing additives which we employ are (1) alkyl mercaptans:
$$RSH$$

(2) dialkyl monosulfides:
$$RSR'$$
and (3) dialkyl sulfides:
$$RSSR'$$

In these formulas R and R' are sulfur-bonded alkyl groups that may be the same or different. It will be noted that these compounds all have in common a structure wherein the sulfur is in its lowest oxidation state (i.e., is divalent), and each sulfur atom is bonded to at least one alkyl group. These compounds are all readily soluble in liquid hydrogen fluoride and form conducting solutions.

The alkyl groups may be straight chains or branched chains and may be primary, secondary or tertiary. The number of carbon atoms is not critical in respect to the functional purpose of the additive, thus octadecyl mercaptan (having 18 carbon atoms) is operative. However, the lower-alkyl compounds are more convenient and economical inasmuch as less fluorine is consumed by their fluorination in the cell and the fluorinated products thereof are more readily separated from the desired products of the organic starting compounds. Unsymmetrical dialkyl compounds can be used but the symmetrical compounds are commercially available at lowest cost.

The preferred additive compounds are those wherein the alkyl groups each contain 3 to 8 carbon atoms. Examples thereof are n-propyl mercaptan, n-butyl mercaptan, isobutyl mercaptan, n-octyl mercaptan, t-octyl mercaptan, dibutyl sulfide, di-t-amyl sulfide, dioctyl sulfide, di-n-propyl disulfide, di-n-amyl disulfide, di-t-amyl disulfide, di-n-octyl disulfide. The presently preferred compound is n-butyl mercaptan.

A minor proportion by weight of the additive, relative to the organic starting material, is employed. A proportion that is a fraction of one percent has been found functional to reduce tar formation. The preferred range is about 1 to 10% by weight relative to the organic starting compound. The optimum proportion for any given starting compound, under the operating conditions employed, can be determined by trial. The additive is fluorinated during operation of the process and is replenished by including the desired proportion in the organic charge that is added to the cell from time to time during an extended run, so as to maintain within desired ranges the concentrations of the starting compound and additive. As an example, when the electrolyte solution contains about 10% by weight of the organic starting compound and the additive is present in amount equal to about 2% of the starting compound, the concentrations of the additive in the total solution is about 0.2%.

The present type of additive compound also serves as a carrier electrolyte (conductivity additive) in anhydrous liquid hydrogen fluoride, and makes it unnecessary to employ some other carrier electrolyte in instances where a carrier electrolyte is necessary or desirable in operation of the electrochemical fluorination process.

Examples of sulfonyl halide starting compounds that can be employed in the practice of the present improved process are benzenesulfonyl fluoride, $C_6H_5SO_2F$, employed in making perfluorocyclohexanesulfonyl fluoride, $C_6F_{11}SO_2F$; p-toluenesulfonyl fluoride (p-methylbenzenesulfonyl fluoride), p-$CH_3C_6H_4SO_2F$, employed in making perfluoro(4-methylcyclohexane)sulfonyl fluoride, $$4\text{---}CF_3C_6F_{10}SO_2F$$

p-ethylbenzenesulfonyl chloride, p-$C_2H_5C_6H_4SO_2Cl$, employed in making perfluoro(4-ethylcyclohexane)sulfonyl fluoride, $4\text{---}C_2F_5C_6F_{10}SO_2F$; p-dodecylbenzenesulfonyl chloride, p-$C_{12}H_{25}C_6H_4SO_2Cl$, employed in making perfluoro(4-dodecylcyclohexane)sulfonyl fluoride $$4\text{---}C_{12}F_{25}C\ F_{10}SO_2F$$

The foregoing starting compounds are illustrative of the sub-class of benzenesulfonyl halide compounds, which is to be understood as generically including the alkylbenzenesulfonyl halides. Further examples are benzenedisulfonyl chloride, $C_6H_4(SO_2Cl)_2$, employed in making a mixture of perfluorocyclohexanedisulfonyl fluoride, $$C_6F_{10}(SO_2F)_2$$

and perfluorocyclohexanesulfonyl fluoride, $C_6F_{11}SO_2F$; diphenyldisulfonyl chloride, employed in making a mixture of bis(perfluorocyclohexanesulfonyl fluoride), $$(C_6F_{10})_2(SO_2F)_2$$

and bis(perfluorocyclohexane)sulfonyl fluoride, $$F(C_6F_{10})_2SO_2F$$

Examples of carbonyl halide starting compounds are phthalyl difluoride, $C_6H_4(COF)_2$, and phthalyl dichloride, $C_6H_4(COCl)_2$, employed in making a mixture of perfluorocyclohexane-dicarboxylic acid fluoride, $C_6F_{10}(COF)_2$, and perfluorocyclohexanecarboxylic acid fluoride, $$C_6F_{11}COF$$

benzoyl chloride, $C_6H_5COCl$, and benzoyl fluoride, $$C_6H_5COF$$

employed in making $C_6F_{11}COF$; methylbenzoyl chloride, $CH_3C_6H_4COCl$, and methylbenzoyl fluoride, $$CH_3C_6H_4COF$$

employed in making perfluoromethylcyclohexanecarboxylic acid fluoride, $CF_3C_6F_{10}COF$; octanoyl chloride, $$C_7H_{15}COCl$$

employed in making perfluorooctanoyl fluoride, $$C_7F_{15}COF$$

A particularly important industrial usage of the present invention is in making the $4\text{---}C_2F_5C_6F_{10}SO_2F$ compound whose potassium salt is in demand as a surface active agent. The starting compound is p-ethylbenzenesulfonyl fluoride or chloride. Prior to adoption of the present invention, no way has been found to prevent the rapid formation of tarry material, which polluted the electrolyte solution, formed a dense tarry deposit on the anode plates, and contaminated the fluorinated product phase that settled to the bottom of the cell and thereby complicated the recovery and purification of the desired product. The inclusion in the electrolyte solution of n-butyl mercaptan, in the proportion of about 3% by weight of the starting compound, for example, inhibits the formation of tarry material so that runs as long as four or five hundred hours can be carried out with little or no detectable formation of tars. The fluorinated products resulting from fluorination of this additive compound have boiling points such that the desired product of the organic starting compound can be readily recovered by fractional distillation of the fluorinated phase that settles to the bottom of the cell. The improvement resulting from the use of our invention has very materially increased the economic efficiency of the process, not only because of the substantial increase in yield of the desired product compound (since the starting compound is not converted in part into undesirable tarry by-products) but also because of the improved efficiency of the cell operation in maintaining efficient processing conditions during long runs.

We claim:
1. An electrochemical process of making fluorocarbon acid fluorides by electrolyzing, in a cell containing an electrode pack having nickel anodes, a current-conducting electrolyte solution comprising anhydrous liquid hydrogen fluoride mixed with a hydrocarbon acid halide starting compound; characterized by the feature that the electrolyte solution includes a small proportion, relative to said starting compound, of an additive that functions to inhibit the formation of tarry material, said additive being a compound selected from the class consisting of alkyl mercaptans, dialkyl monosulfides and dialkyl disulfides.
2. A process according to claim 1 wherein the alkyl groups of the additive compound contain 3 to 8 carbon atoms.
3. A process according to claim 1 wherein the organic starting compound is a benzenesulfonyl halide.
4. A process according to claim 1 wherein the organic starting compound is a benzenesulfonyl halide and the alkyl groups of the additive compound contain 3 to 8 carbon atoms.
5. A process according to claim 4 wherein the additive is n-butyl mercaptan.

References Cited in the file of this patent
UNITED STATES PATENTS 2,717,871     Scholberg et al.     Sept. 13, 1955
2,732,398     Brice et al.     Jan. 24, 1956

UNITED STATES PATENT OFFICE
CERTIFICATE OF CORRECTION

Patent No. 3,028,321            April 3, 1962

Richard D. Danielson et al.

It is hereby certified that error appears in the above numbered patent requiring correction and that the said Letters Patent should read as corrected below.

Column 2, line 37, for "sulfides" read -- disulfides --; column 3, line 34, for "4-$C_{12}F_{25}CF_{10}SO_2F$" read -- 4-$C_{12}F_{25}C_6F_{10}SO_2F$ --.

Signed and sealed this 20th day of November 1962.

(SEAL)
Attest:

ERNEST W. SWIDER            DAVID L. LADD
Attesting Officer            Commissioner of Patents